United States Patent [19]

Fujimoto et al.

[11] Patent Number: 5,663,977

[45] Date of Patent: Sep. 2, 1997

[54] GAS LASER APPARATUS

[75] Inventors: Junichi Fujimoto, Kamakura; Hakaru Mizoguchi, Hiratsuka, both of Japan

[73] Assignee: Komatsu Ltd., Japan

[21] Appl. No.: 619,530

[22] PCT Filed: Sep. 28, 1994

[86] PCT No.: PCT/JP94/01600

§ 371 Date: Mar. 19, 1996

§ 102(e) Date: Mar. 19, 1996

[87] PCT Pub. No.: WO95/09460

PCT Pub. Date: Apr. 6, 1995

[30] Foreign Application Priority Data

Sep. 29, 1993 [JP] Japan .................. 5-052759

[51] Int. Cl.$^6$ .................................. H01S 3/22
[52] U.S. Cl. .................. 372/55; 372/57; 372/58; 372/109
[58] Field of Search ............... 372/55, 56, 57, 372/58, 59, 60, 61, 62, 64, 109

[56] References Cited

U.S. PATENT DOCUMENTS

| | | | |
|---|---|---|---|
| 3,605,038 | 9/1971 | Byrne et al. | 372/58 X |
| 3,982,200 | 9/1976 | Hoag et al. | 372/55 X |
| 4,134,083 | 1/1979 | Sasnett et al. | 372/58 X |
| 4,592,063 | 5/1986 | Accetta et al. | 372/58 |
| 4,852,114 | 7/1989 | Karube | 372/58 |
| 5,426,662 | 6/1995 | Mefferd et al. | 372/99 |

FOREIGN PATENT DOCUMENTS

3-135089  6/1991  Japan .................. 372/55 X

*Primary Examiner*—Brian Healy
*Attorney, Agent, or Firm*—Greer, Burns & Crain, Ltd.

[57] ABSTRACT

A gas laser apparatus is operated in such a manner that gas supplied to a laser chamber is excited for laser oscillation. A cabinet (11) which houses gas containers (12 and 13) is located adjacent to the laser oscillator (1) or integrated with it. The piping for the laser gas is incorporated in the cabinet. Such a structure realizes an economical laser of stabilized performance and easy maintenance.

7 Claims, 7 Drawing Sheets

PULLED OUT
FROM FRAME

FIG.6(a)

PUSHED IN

GAS LASER APPARATUS

TECHNICAL FIELD

This invention relates to a gas laser apparatus such as an excimer laser that is used in the microworking of ceramics and polymer materials and in semiconductor lithographic technology.

BACKGROUND ART

An excimer laser apparatus usually must be equipped with gas containers for replacing laser medium gases. Laser medium gases that are required are a rare gas (krypton, xenon, and the like), a halogen gas (fluorine, hydrogen chloride, and the like), and a buffer gas (neon, helium, and the like). When an excimer laser is used in ordinary industrial applications, the full replacement of the laser medium gases is performed from about once daily to about once every three days, with several hundred liters (calculated at atmospheric pressure) of gas being consumed each time. The gases are usually supplied from gas containers which have a capacity of 3 to 47 liters and a charge pressure of 20 to 150 $kgf/cm^2$.

The price of the gas per unit of volume is generally lower for a greater volume of gas that can be charged into one container, and a larger container also requires less frequent replacement work. Accordingly, with a conventional excimer laser apparatus, the gas containers were set up together in one place somewhere away from the laser apparatus, and the gases were supplied to the laser apparatus through gas piping.

Furthermore, halogen gases, which are one of the laser medium gases, are extremely toxic, and various safety measures must therefore be implemented. Consequently, in the past the container used for the halogen gas was stored in a container cabinet, inside of which was forcibly ventilated. The exhaust air was released into the atmosphere only after it was purified with exhaust gas treatment equipment (hereinafter referred to as a scrubber). In addition, the inside of the cabinet was furnished with a gas leakage detector, a container cock emergency shutoff valve, and so on.

However, since the gas containers were set up together in one place somewhere away from the laser apparatus with such a conventional apparatus, the gas supply and treatment system aside from the laser apparatus itself, such as the gas container stand, the cabinet, the gas piping, and the scrubber, ended up being quite large. An arrangement such as this was advantageous in terms of costs and the management of the containers when gas was supplied to numerous laser apparatuses, but when only a few laser apparatuses were involved, this setup was unsatisfactory from the standpoints of cost and layout.

Moreover, installation restrictions in factories and the like sometimes require that the piping carrying the fluorine, chlorine, and other reactive gases will extend for dozens of meters, which means that the inner surface area of the piping is very large, which is a drawback in that the admixture of impurities or particles into the laser gas can result in unstable laser performance.

There were also cases in which the container cabinet was positioned beneath the laser apparatus, but since this meant that a 47-liter container had to be laid on its side, the work of replacing the container was extremely difficult. Furthermore, the laser apparatus and the laser cabinet are constructed by separate units in this case, and the gas piping used to connect the two was exposed on the outside, so there was no protection against some kind of object bumping into this piping and causing a leak, and this constituted a safety problem. Also, this prior art was not designed so that the work involved during replacement could be carried out on one side of the laser apparatus, so work space had to be allocated all the way around the cabinet, which was a drawback in that the laser apparatus took up more floor space.

Finally, setting up the laser apparatuses and the container cabinet separately when only a few laser apparatuses were to be used resulted in extremely high costs for the container cabinet and gas piping.

The present invention was conceived in light of this situation, and an object thereof is to provide an inexpensive laser apparatus that is easy to maintain and whose laser performance is highly stable.

DISCLOSURE OF THE INVENTION

The present invention is a gas laser apparatus that performs laser oscillation by supplying laser gases to a laser chamber and exciting the laser gases, wherein a gas cabinet that houses gas containers containing laser gases is disposed adjacent to the laser oscillator, these units are housed in the same housing, and the gas piping used for the laser gases is housed in this housing.

Specifically, the gas cabinet that houses the laser gas containers is disposed adjacent to the laser oscillator, the gas cabinet and the laser oscillator are both within the same housing, and the gas piping used for the laser gases is housed within this housing.

Therefore, since the laser gas containers are housed within the laser apparatus itself, there is no need for an expensive external gas cabinet, which means that the initial investment is lower when a small number of laser apparatuses are introduced. Also, since a gas container pull-out construction is employed, laser maintenance and gas container replacement can be carried out at the same time on one side of the apparatus, which improves maintenance efficiency. Also, since the gas piping is shorter, fewer impurities and particles are generated from the inner surfaces of the gas piping, which allows the laser performance to be more stable.

BEST MODE FOR CARRYING OUT THE INVENTION

The present invention will now be described in detail through embodiments illustrated in the appended drawings.

Figure 1A:
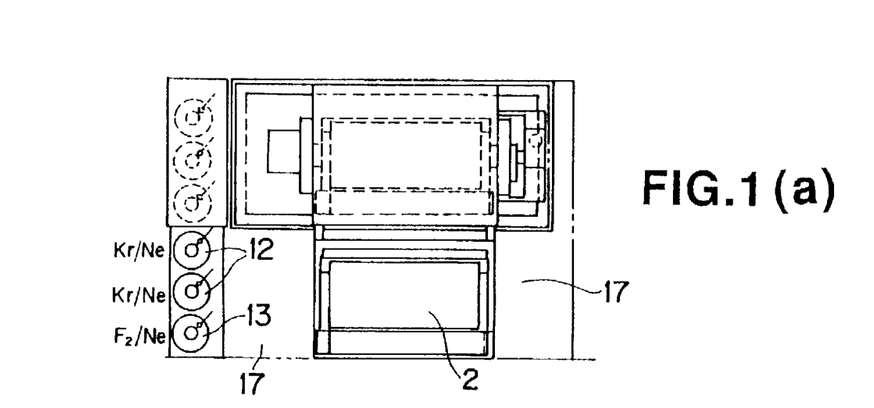
FIGS. 1a through 1d are plan, front and side views of the first embodiment of the present invention.
Figure 1B:
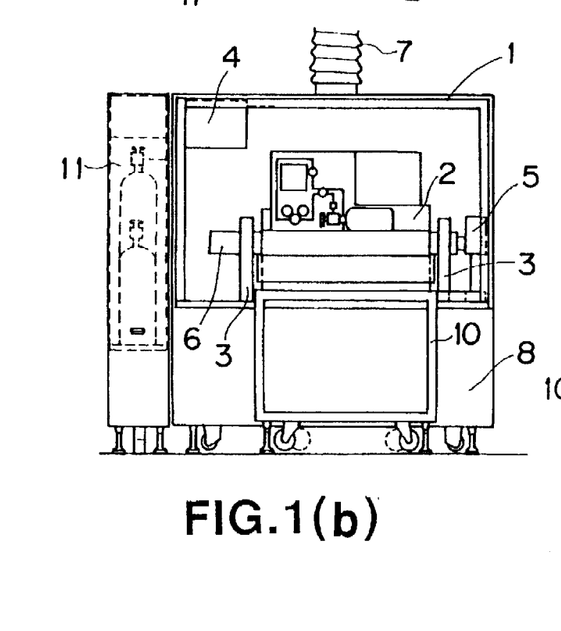
Figure 1C:
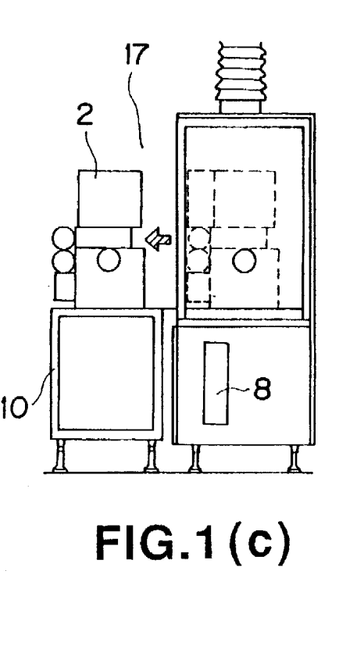
Figure 1D:
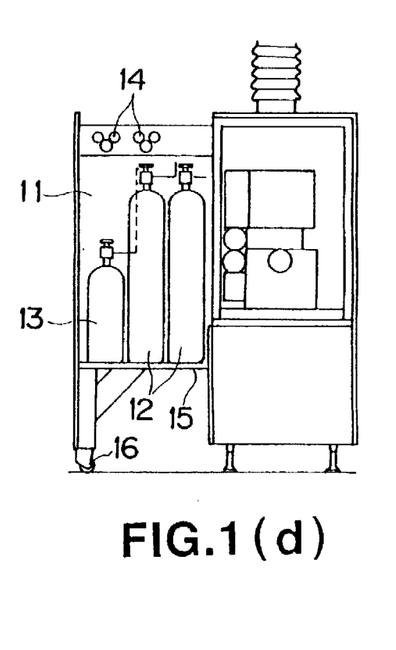

FIGS. 1a through 1d illustrate the first embodiment of the present invention. FIG. 1a is a plan view, FIG. 1b is a front view, FIG. 1c is a side view illustrating a state in which a laser chamber 2 rides on a carriage 10, and FIG. 1d is a side view illustrating a state in which a gas container storage cabinet 11 is pulled out.

In FIGS. 1a through 1d, 1 is a laser apparatus, 2 is a laser chamber unit, 3 is a laser resonator, 4 is a high-voltage power source, 5 is a front optical system, 6 is a rear optical system, 7 is an exhaust duct, and 8 is a laser controller.

Further, 10 is a laser chamber unit take-out carriage, 11 is a gas container storage cabinet, 12 is a mixed gas (rare gas and buffer gas) container, 13 is a mixed gas (halogen gas and buffer gas) container, 14 is gas take-out piping, 15 is a linear slide bearing, and 16 is a castor.

Specifically, in this case, the use of the take-out carriage 10 allows the laser chamber unit 2 to be taken out easily toward the maintenance area 17, and this construction is used to replace the laser chamber unit 2. FIG. 1a illustrates a state in which the laser chamber unit 2 has been taken out into the maintenance area 17 by means of the carriage 10.

The gas container storage cabinet 11, which holds the gas containers 12 and 13 that supply the laser medium gases, is positioned next to the side of the laser apparatus 1. However, the gas container storage cabinet 11 and the laser chamber unit 2 are both in the same housing.

As shown in FIG. 1d, the gas container storage cabinet 11 can be pulled out toward the maintenance area 17 during replacement of the gas containers 12 and 13 by means of a slide mechanism comprising linear slide bearings 15, castors 16, and the like, which facilitates replacement of the containers. In addition to the replacement of the gas containers, this design allows regulator adjustment, valve operation, and the like all to be performed in a state in which this slide mechanism has been pulled out.

Figure 2:
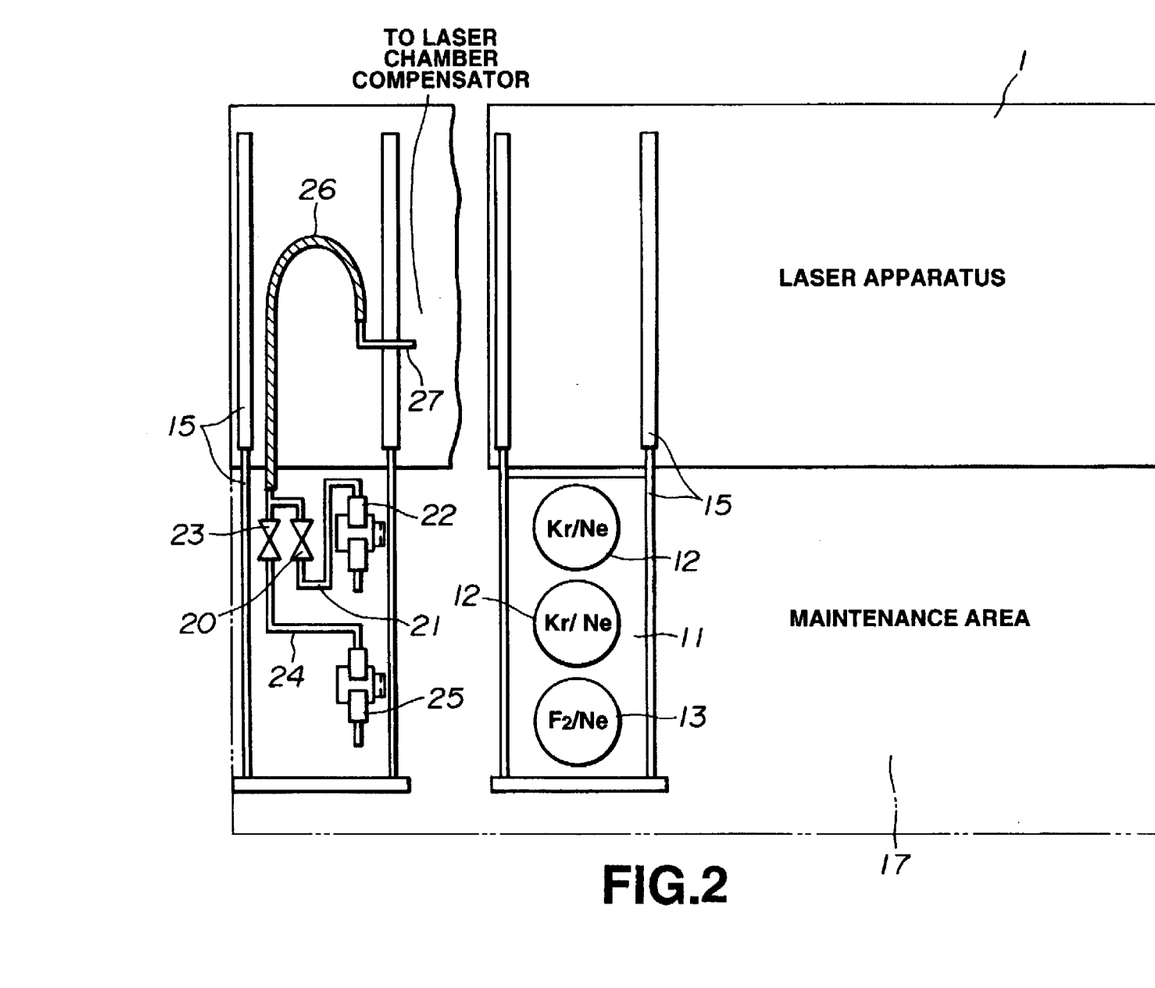
FIG. 2 is a diagram illustrating the details of the container cabinet in the first embodiment of the present invention.

FIG. 2 is a plan view of the detailed structure of the gas container storage cabinet 11. The cabinet 11 that houses the gas containers 12 and 13 is pulled out from the laser apparatus 1 toward the maintenance area 17 by means of the linear slide bearings 15.

The left portion of FIG. 2 illustrates the construction of that portion of the gas container storage cabinet 11 above the gas containers. Piping used for the container 12, comprising an air actuated valve 20, a stainless steel pipe 21, a regulator 22, and the like, and piping used for the container 13, comprising an air actuated valve 23, a stainless steel pipe 24, a regulator 25, and the like, are connected to a pipe 27 on the side of the laser chamber 2 via a flexible tube 26. The interposition of the flexible tube 26 allows the storage cabinet 11 to slide.

Figure 3:
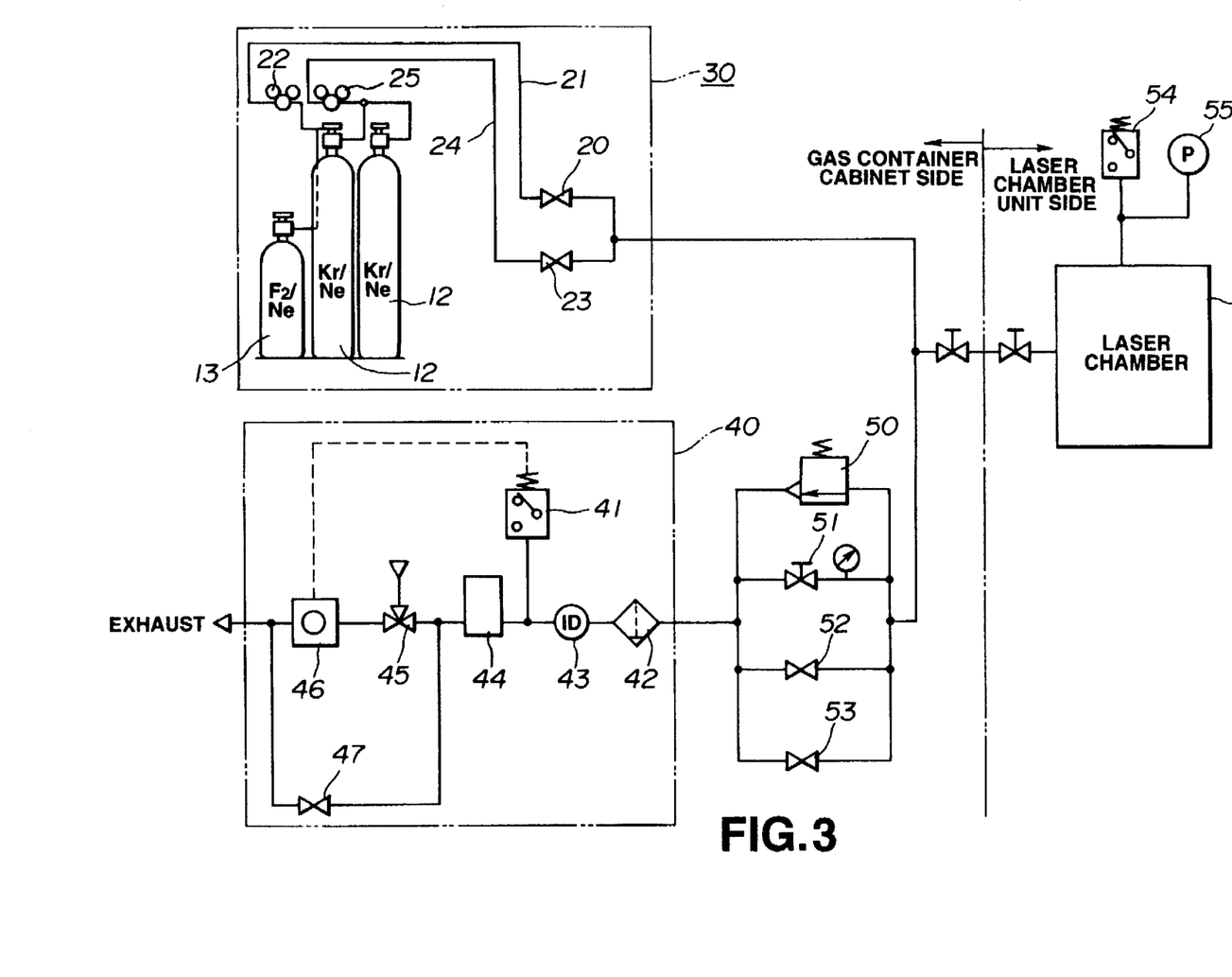
FIG. 3 is a gas piping schematic for the first embodiment of the present invention.
Figure 4:
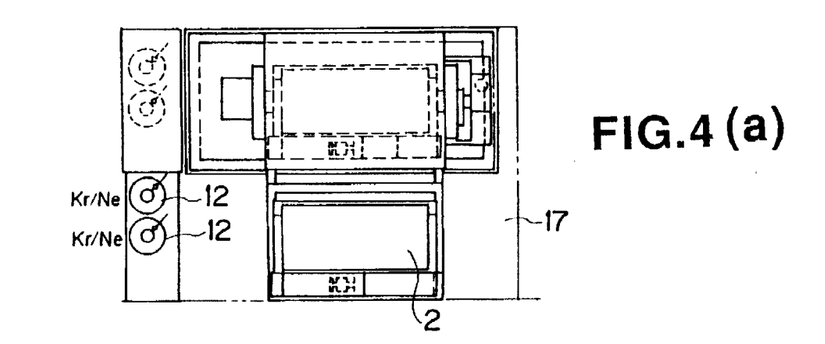
FIGS. 4a through 4d are plan, front and side views of the second embodiment of the present invention.
Figure 5A:
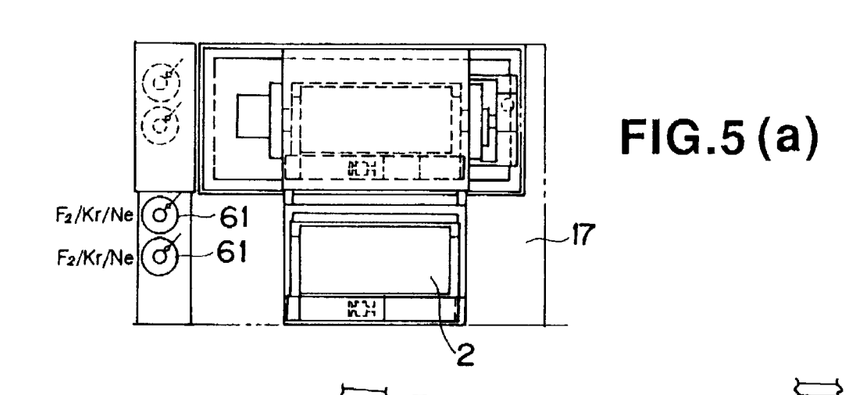
FIGS. 5a through 5d are plan, front and side views of the third embodiment of the present invention.
Figure 5B:
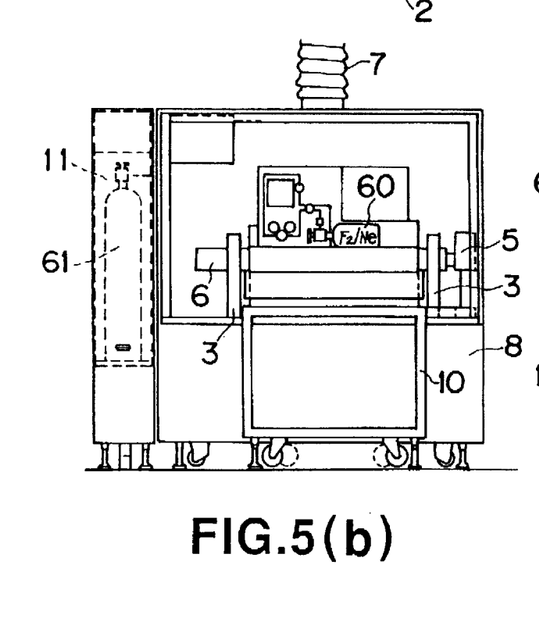
Figure 5C:
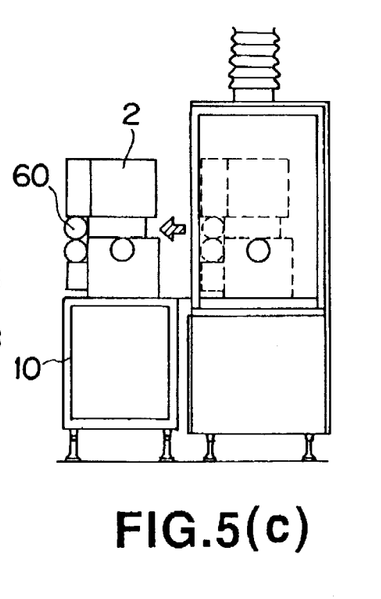
Figure 5D:
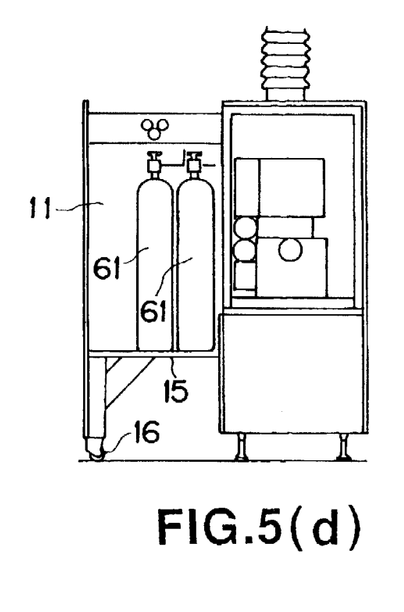

FIG. 3 is a system schematic of the gas piping in the embodiment illustrated in FIGS. 1a through 1d. The gas container storage cabinet 11 side and the laser chamber unit 2 side are connected by a single pipe. Specifically, as shown in FIG. 2, a gas supply system 30 comprises gas containers 12 and 13, air actuated valves 20 and 23, stainless steel pipes 21 and 24, regulators 22 and 25, and so on. A gas exhaust system 40 comprises a pressure switch 41, a halogen filter 42, a break through sensor 43, a foreline trap 44, an automatic leak valve 45, a vacuum pump 46, an air pressure actuated valve 47, and so on.

A relief valve 50, a manual valve 51, and air pressure actuated valves 52 and 53 are interposed between the gas exhaust system 40 and the laser chamber 2. A pressure switch 54 and a pressure converter 55 are provided on the laser chamber 2 side.

The use of a KrF excimer laser is supposed in this embodiment, so two types of laser medium gas, namely, a mixed gas of a rare gas and a buffer gas (Kr 1.5%/Ne) and a halogen gas and a buffer gas ($F_2$ 5%/Ne), are supplied by the containers 12 and 13. The gas is controlled during operation primarily by supplying shortage of $F_2$ gas due to the consumption thereof (halogen injection), and by injecting Kr/Ne mixed gas, which serves to compensate for the output decrease caused by the consumption of $F_2$ gas and the generation of impurities accompanying a reaction with substances on the inner surface of the chamber.

The various devices and gas piping shown in FIG. 3 are all held inside the housing of the laser apparatus, so there will be no mistaken connection of the gas piping by the operator, and assembly work can be performed at the factory, so the quality of the laser apparatus is more consistent than when the piping is connected on site.

Also, the inside of the housing of the laser apparatus in this case, including the gas container storage cabinet 11 and the laser chamber unit 2, is evacuated all together by means of the exhaust duct 7, and the evacuated gas is released to the atmosphere only after being treated by the scrubber. Accordingly, there is no danger of injury to humans even in the unlikely event of a leak from the piping.

Thus, in this embodiment, a halogen gas/buffer gas mixed gas container 13, a rare gas/buffer gas mixed gas container 12, and the piping used to supply and exhaust these gases are all housed in a specific gas cabinet 11, and this gas cabinet 11 is constructed integrally with the laser unit, which makes maintenance easier and improves safety.

FIGS. 4a through 4d illustrate the second embodiment of the present invention. In this embodiment, the Kr/Ne mixed gas container 12 is housed in the gas cabinet 11 just as in the previous embodiment, but the $F_2$/Ne mixed gas container 13 is placed inside the laser chamber unit 2, and the replacement of this $F_2$/Ne mixed gas container 13 is performed during the maintenance of the laser chamber. Specifically, the $F_2$/Ne mixed gas container 13 on the laser chamber 2 side and the gas piping used for this $F_2$/Ne mixed gas are integrally constructed as the same unit as the laser chamber 2, and when this unit is taken out, it rides on a carriage 10 along with the laser chamber.

Since it is better in this case for the volume of the $F_2$/Ne mixed gas container 13 to be as small as possible, the concentration of the $F_2$ gas is raised, the charging pressure is raised, or another such means is employed to lower the volume of the gas container 13.

FIGS. 5a through 5d illustrate the third embodiment of the present invention. In this embodiment, a gas container 60 charged with only that portion of the $F_2$/Ne mixed gas used for the halogen injection is placed on the laser chamber 2 side, and a gas container 61 charged with a three-type mixed gas of Kr/$F_2$/Ne is placed on the gas cabinet 11 side. Again in this embodiment, the container 60 used for halogen injection is replaced during the maintenance of the laser chamber. In this case, since only the halogen gas used for the halogen injection is placed on the laser chamber side, a more compact and safer gas laser apparatus can be realized.

Figure 6A:
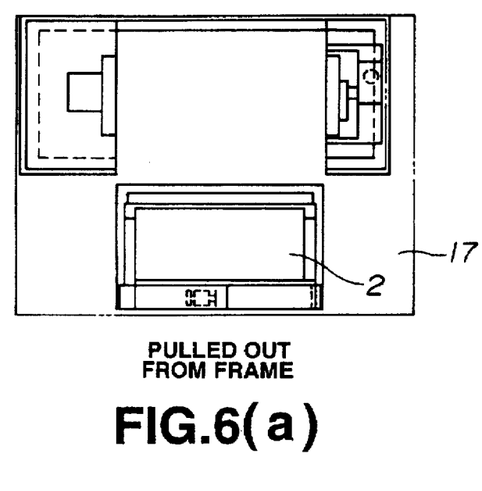
FIGS. 6a through 6d are plan, front and side views of the fourth embodiment of the present invention.
Figure 6B:
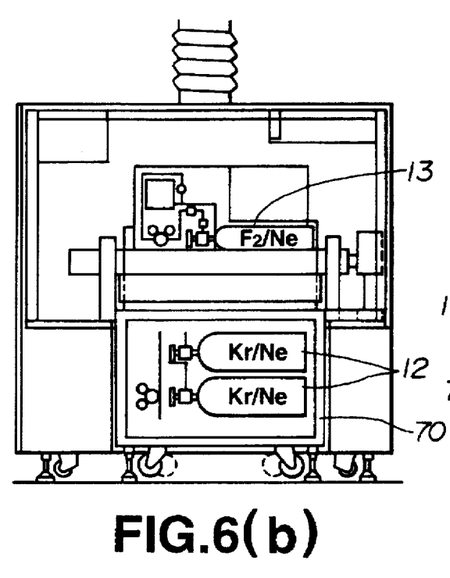
Figure 6C:
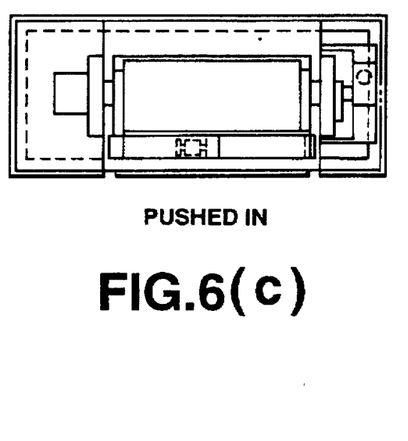
Figure 6D:
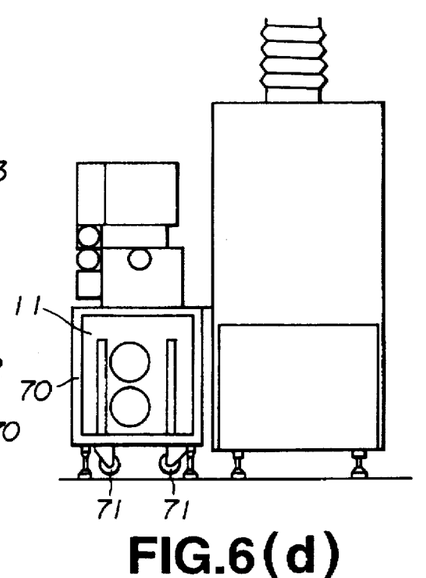
Figure 7:
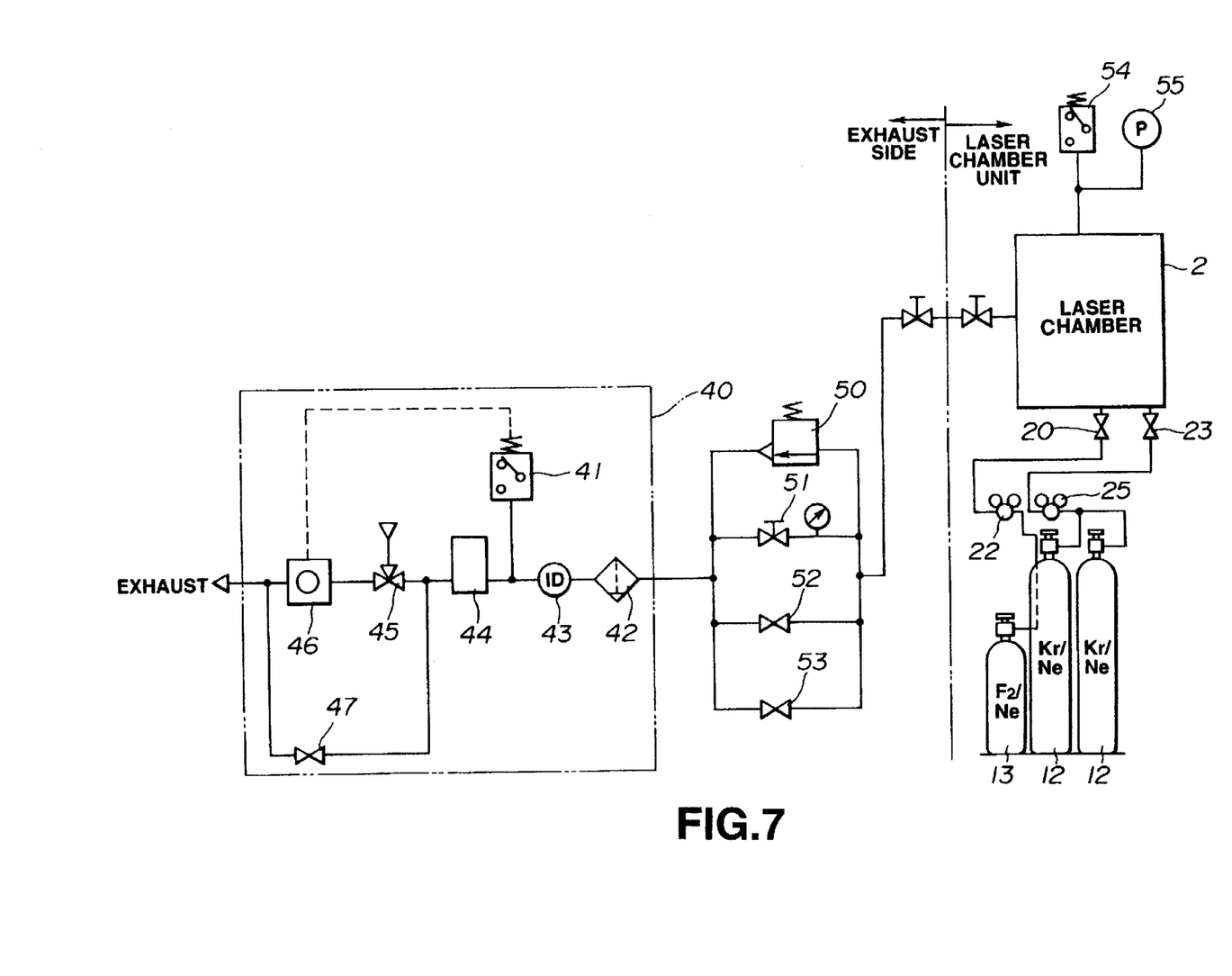
FIG. 7 is a gas piping schematic for the fourth embodiment of the present invention.

FIGS. 6a through 6d illustrate the fourth embodiment of the present invention, and FIG. 7 is a system schematic of the gas piping in this embodiment. In FIG. 7, those components that serve the same function as the structural elements in FIG. 3 are labeled with the same symbols.

In this fourth embodiment, both the Kr/Ne mixed gas container 12 and the $F_2$/Ne mixed gas container 13 are housed inside the laser chamber unit 2, with the $F_2$/Ne mixed gas container 13 being placed on top of the pull-out carriage 70, and the Kr/Ne mixed gas container 12 being placed inside the pull-out carriage 70. Naturally, the various piping units pertaining to these gas containers are also housed inside the laser chamber unit 2. Specifically, in this embodiment, the pull-out carriage 70 itself is able to slide on castors 71 between the laser unit and the maintenance area 17, and this carriage 70 itself is incorporated into the laser unit along with the laser chamber unit 2, the gas containers 12 and 13, and the like.

FIG. 6a illustrates a state in which the carriage 70 has been pulled out. FIG. 6c illustrates a state in which the carriage 70 has been pushed back into the laser chamber unit 2. The laser chamber unit 2 and the gas unit can be pulled out into the maintenance area at the same time.

In this fourth embodiment, the container cabinet on the lower side of the carriage 70 may be designed such that it can be pulled to slide out from the carriage 70.

In the first through third embodiments shown in FIGS. 1a through 1d, FIGS. 4a through 4d, and FIGS. 5a through 5d, it is also possible to use a pull-out carriage 70 that is incorporated into the laser unit, just as in the fourth embodiment shown in FIGS. 6a through 6d.

Also, in the embodiment in FIGS. 4a through 4d, the non-toxic Kr/Ne mixed gas container may be placed separately from the laser apparatus, just as in prior art, and only the toxic halogen gas container installed in the laser unit.

INDUSTRIAL APPLICABILITY

The present invention is useful in applications to a gas laser apparatus that supplies laser gases to a laser chamber and performs laser oscillation by exciting the laser gases.

We claim:

1. A gas laser apparatus that performs laser oscillation by supplying laser gases to a laser chamber and exciting the laser gases, wherein:

a gas cabinet for housing gas containers for the laser gases in an erect state, is disposed adjacent to the laser oscillator, the gas cabinet being structured such that it can be pulled out from the side of the laser oscillator; and a gas piping for connecting the gas containers inside the gas cabinet to the laser chamber unit of the laser oscillator, is made of flexible tubes.

2. A gas laser apparatus as defined in claim 1, wherein the laser gases are a rare gas, a halogen gas and a buffer gas, and the gas cabinet houses a gas container filled with a mixed gas of a rare gas and a buffer gas, and a gas container filled with a mixed gas of a halogen gas and a buffer gas.

3. A gas laser apparatus as defined in claim 1, wherein the laser gases are a rare gas, a halogen gas and a buffer gas, the gas cabinet houses a gas container filled with a mixed gas of a rare gas and a buffer gas, and the laser chamber unit of the laser oscillator houses a gas container filled with a mixed gas of a halogen gas and a buffer gas.

4. A gas laser apparatus as defined in claim 3, wherein the laser chamber unit can be removed from the laser oscillator.

5. A gas laser apparatus as defined in claim 1, wherein the laser gases are a rare gas, a halogen gas and a buffer gas; the gas cabinet houses a gas container filled with a mixed gas of a rare gas and a buffer gas, and a gas container filled with a mixed gas of a halogen gas and a buffer gas; and the laser chamber unit of the laser oscillator houses a gas container filled with a mixed gas of a halogen gas and a buffer gas.

6. A gas laser apparatus as defined in claim 5, wherein the laser chamber unit can be removed from the laser oscillator separately.

7. A gas laser apparatus that performs laser oscillation by supplying laser gases to a laser chamber and exciting the laser gases, wherein:

a gas cabinet for housing gas containers for the laser gases, is disposed adjacent to, or integrated with, the laser oscillator, the gas cabinet being provided with castors that allow the gas cabinet to be pulled out from the side of the laser oscillator, and the gas cabinet also houses a gas piping system for supplying gases from the gas containers to the laser oscillator and discharging the gases from the laser oscillator.

* * * * *